United States Patent [19]

Rogus

[11] Patent Number: 4,659,240

[45] Date of Patent: Apr. 21, 1987

[54] BEARING PROTECTOR

[76] Inventor: Thomas E. Rogus, Rte. 2, Box 99, Strandquist, Minn. 56758

[21] Appl. No.: 885,220

[22] Filed: Jul. 14, 1986

[51] Int. Cl.$^4$ .............................................. F16C 33/74
[52] U.S. Cl. .................... 384/145; 384/152; 384/482
[58] Field of Search ............... 384/145, 152, 482, 144, 384/146, 541

[56] References Cited

U.S. PATENT DOCUMENTS

| | | | |
|---|---|---|---|
| 3,339,988 | 9/1967 | Schultze | 384/145 |
| 3,447,843 | 6/1969 | Shipman | 384/144 |
| 3,449,024 | 6/1969 | Lichte | 384/482 |
| 4,483,569 | 11/1984 | Smith | 384/145 |

OTHER PUBLICATIONS

Nilos Rings, S. W. Anderson Company, 7 pages, Catalog Z112e.

Primary Examiner—Lenard A. Footland
Attorney, Agent, or Firm—Vidas & Arrett

[57] ABSTRACT

A bearing protector attached to a shaft abuts against the inner race of a bearing mounted to a housing. The body of the protector extends over substantially all of the outer race. The protector does not contact the outer race due to a running clearance. Side loads which would otherwise contact the bearing seals are held by the protector which is secured to and rotates with the shaft.

12 Claims, 11 Drawing Figures

BEARING PROTECTOR

FIELD OF THE INVENTION

The device of the invention relates to bearings which in service may be exposed to heavy side pressure from vines and dirt as in farming applications.

BACKGROUND OF THE INVENTION

Since about the 1950s the majority of the agricultural equipment changed from solid bearings to ball and roller bearings because of the obvious advantages of the construction. Spherical bearings, which are self-aligning, have found many applications in part due to their ability to withstand high radial loads. Ordinarily, spherical bearings do not encounter substantial thrust loads which are axial to this shaft.

One problem which exists in the agricultural machinery industry is that of bearing contamination in many applications. Many pillow blocks and bearing holders are exposed to foliage, dirt, mud, stones, and various other types of debris. These conditions cause foreign materials to enter the bearing when the seal fails. The lubrication of the bearing is then contaminated which causes the bearing to fail due to blockage and improper lubrication.

Since the key to bearing protection is to keep contamination out of the internal moving parts, manufacturers have constantly been developing new and more effective seals. However, many seals are not designed to withstand heavy side pressure of vines and mud and will quickly fail in such applications. Sophisticated bearing seals have been designed in which a triple lip seal is employed. The seal is stationary in relation to the shaft in such seals. Dirt tends to eat the rubber seals out when pushed into the seal at high pressure. Although triple lip seals such as Fafiner brand seals increase the life of a bearing they are expensive and still do not effectively protect the bearing from thrust loads.

Bearing flings have been used to keep dirt from the bearing. Bearing flings are pressed fit onto an extended race bearing. Flings are not able to withstand appreciable side thrust since they are merely intended to throw dirt outwardly away from the seals.

Nilos brand rings are bearing seals which are clamped to a bearing housing such that the Nilos ring does not move. The manufacturer states that Nilos rings cannot be used on bearings which make self-aligning movements such as spherical bearings. Sealing is obtained by the sealing edge rotating under slight pressure against either the inner or outer bearing ring. This results in a shallow groove worn into the hardened bearing ring to produce a miniature labyrinth. Nilos rings require housings for attachment.

SUMMARY OF THE INVENTION

The device of the invention, referred to herein as a bearing protector, protects sealed bearings. The protector of the invention allows spherical bearings to withstand very high thrust loads over a very wide range of speeds.

The bearing protector consists of a body which surrounds the shaft adjacent to the inner and outer races of the bearing. The body is attached directly to the shaft, not to the housing. The bearing protector is designed to fit tightly against the inner race which rotates with the shaft and protector. The body of the protector extends over and covers the outer race of the bearing without contacting the outer race.

The object of the invention is to provide a device which will keep foreign materials from bearing seals thus greatly increasing the bearing life.

When bearings are used without the bearing protection of the invention, foreign materials will often wrap around the shaft adjacent the bearing to such a degree that a chisel and hammer are required to remove the materials. Such wrapping occurs because the bearing portion is stationary.

The vines and other debris exert heavy side pressure on the bearings which causes even the best seals to fail. It has been found that when the bearing protector of the invention is employed, such packing adjacent the bearing is lessened since the protector itself rotates and does not create a packing effect. Additionally, the bearing protector is rigidly held to the shaft and can thereby take very high side loads.

The bearing protector of the invention keeps contamination away from the bearing and its seals. Large particles are not allowed to contact the seal of the bearing which keeps pressure off the bearing seals. The bearing protector turns on the shaft and the centrifugal force keeps fine particles away from the bearing seals. Also, if grease is applied to the inside of the protector, the protector itself may form an additional seal between the face of the bearing and the inside of the protector.

When protectors are mounted to both sides of the bearing the bearing protectors help keep the shaft in a more lateral, stationary position.

BRIEF DESCRIPTION OF THE DRAWINGS

A detailed description of the invention is hereinafter described with specific reference being made to the drawings in which.

DETAILED DESCRIPTION OF THE INVENTION

Figure 1:
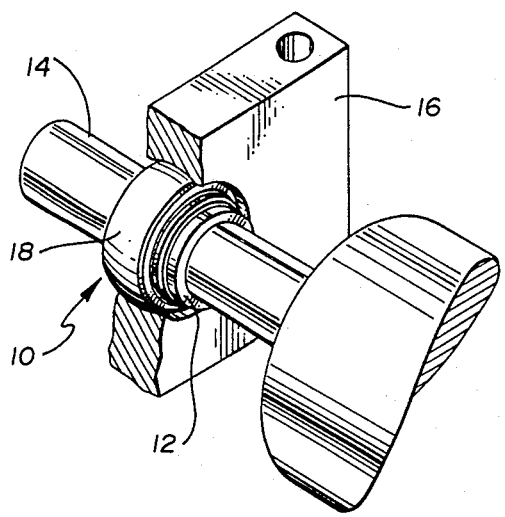
FIG. 1 is a perspective view of an unprotected spherical bearing journaling a shaft through a pillow block which has been cut away.
Figure 2:
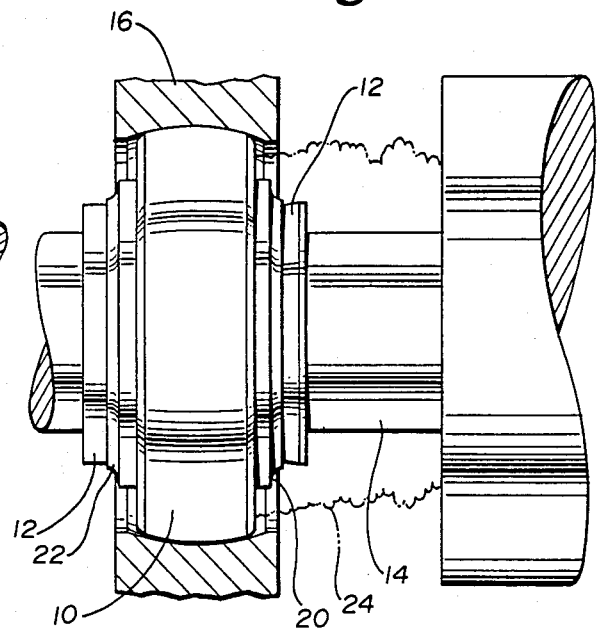
FIG. 2 is a side elevational view of the elements of FIG. 1 with the pillow block shown in section and debris shown in phantom wound around the shaft.

For reference purposes, a conventional spherical bearing 10 is shown in FIGS. 1 and 2. Spherical bearing 10 typically includes an inner race 12 fastened to shaft 14 by an eccentric lock, set screw or other mechanical means. Bearing 10 is mounted within a pillow block 16 or similar holder. Spherical bearings are self-aligning within their holders due to the constructions of their outer races 18. A shown, bearing 20 usually includes seals 20, 22, respectively on each side.

Debris 24 in the form of dirt, vines, mud and stones may become packed against the rotating shaft 14 and bearing 10. The debris 24 is often packed against the bearing under high pressure damages and enters the seals, greatly lessening the bearing life.

Figure 3:
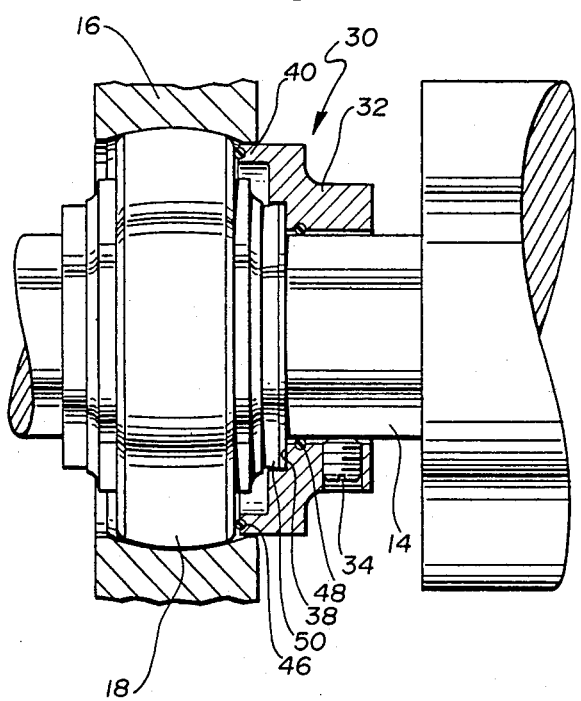
FIG. 3 is a view similar to that of FIG. 2 with the addition of a bearing protector held in position by a set screw and collar lock, the protector is shown in section and has an internal step abutting the bearing inner race.
Figure 4:
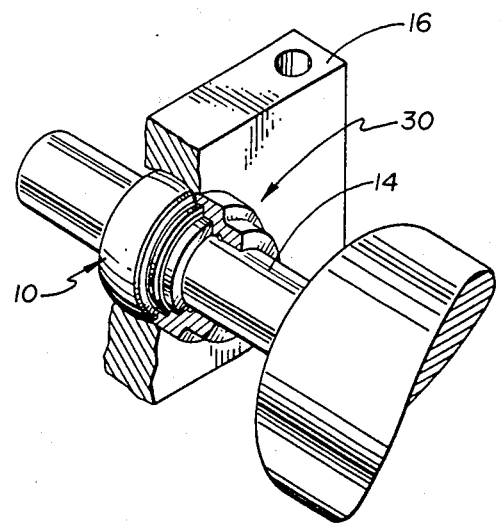
FIG. 4 is a view similar to that of FIG. 1 showing a bearing protector of FIG. 3 installed with the protector cut away.

The bearing protector 30, in its simplest form, is shown in FIGS. 3 and 4. Protector 30 is formed of a body 32 which envelopes shaft 14 and covers the inner 12 and outer races 18 of bearing 10. Protector 30 fits closely over shaft 14 which prevents large particles from entering the space between the shaft 14 and bearing 10.

A slight tolerance between the protector and shaft is needed to enable the protector to be slipped over the shaft. The protector 30 is rigidly held to the shaft 14 by set screw 34 or similar positive locking mechanism.

The protector is positioned directly against inner race 12. The abutment between protector 30 and inner race 12 may be a step 38 as shown in FIGS. 3 and 4 if the inner race 12 is extended. Alternatively, if the inner race is flush with the outer race, the abutment may be in the form of an oval, outwardly extending lip (not shown) which contacts the inner, but not outer race.

Protector 30 also includes an outer rim 40 which is slightly less in diameter than the opening described by pillow block 16 as shown in FIGS. 3 and 4. Outer rim 40 extends toward outer race 18 of bearing 10 as shown. Outer rim 40 does not contact outer race 18. A gap 44 of about 5 to 15 thousandths of an inch is designed by configuring the outer rim 40 and step 38 such that the gap 44 is present when step 38 is firmly positioned against inner race 12. As shown, gap 44 may be closed by an o-ring 46. If employed, o-ring 46 provides a sealing function to protector 30.

Protector 30, as shown in FIGS. 3 and 4, provides thrust load protection to bearing 10 by preventing the application of debris under pressure to seals 20. The close tolerance between body 32 and shaft 14 prevents large particles from contacting to the bearing. The outer rim 40 of the protector substantially covers the outer race 18 to prevent side pressure from being exerted directly on the bearing. The small running gap 44 allows protector 30 to freely rotate with the shaft 14 while limiting the introductions of particles near the bearing. Dirt which does enter the space between bearing 10 and protector 30 will not be under significant, damaging pressure. The rotation of the protector also tends to throw dirt away from the bearing.

The effects of packing of debris around the bearing 10 is negligible since any packing pressure is directed against protector 30, which is firmly held to shaft 14. Also, packing is decreased since the protector itself rotates and does not create the packing effect found in unprotected bearings as shown in FIG. 2.

With the addition of protector 30, bearings can withstand thrust loads of up to 1000 pounds per square inch without damage. Many unprotected bearings may safely handle only 10 pounds per square inch of side loading before seals fail. The protector lessens the need for expensive seals since the protected bearing does not need seals that resist high thrust loads.

As shown in FIG. 3, bearing protector 30 may further include an o-ring shaft seal 48 to make protector 30 an effective seal. Protector 30 may be formed from a wide variety of metals or plastics, depending only on the applications and amount of thrust protection desired.

Figure 5:
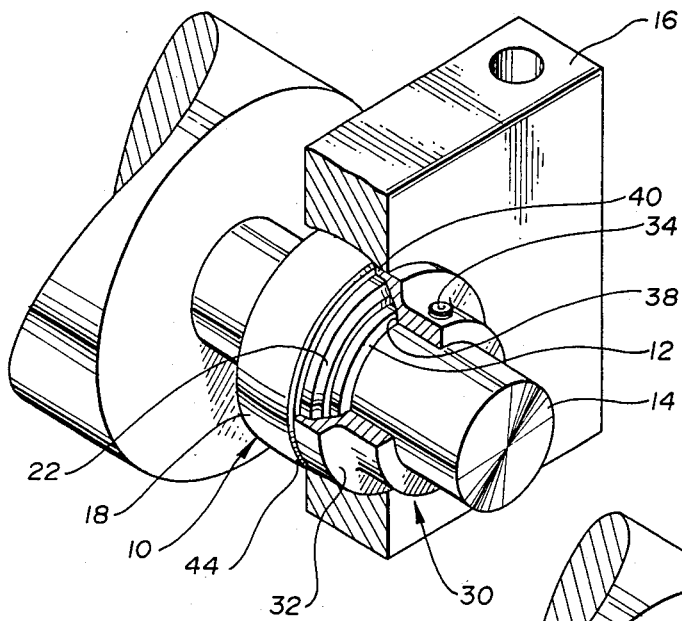
FIG. 5 is a perspective view of an alternative form of the invention, the pillow block and protector are shown cut away.

The form of the invention shown in FIG. 5 is similar to that shown in FIGS. 3 and 4. However, protector 30 in FIG. 3 is fastened to the locking side of the bearing 10 to which the eccentric inner race 50 is locked to the shaft 14. Protector 30 of FIG. 3 may be locked to shaft 14 by an eccentric lock in the same manner as is often used to lock inner race 50 to shaft 14. As shown, protector 30 is locked to the eccentric inner race 50. Alternatively, protector 30 may be held to shaft 14 by set screw 34. In any event, protector 30 of FIG. 5 includes the same features as shown in FIGS. 3 and 4.

Figure 6:
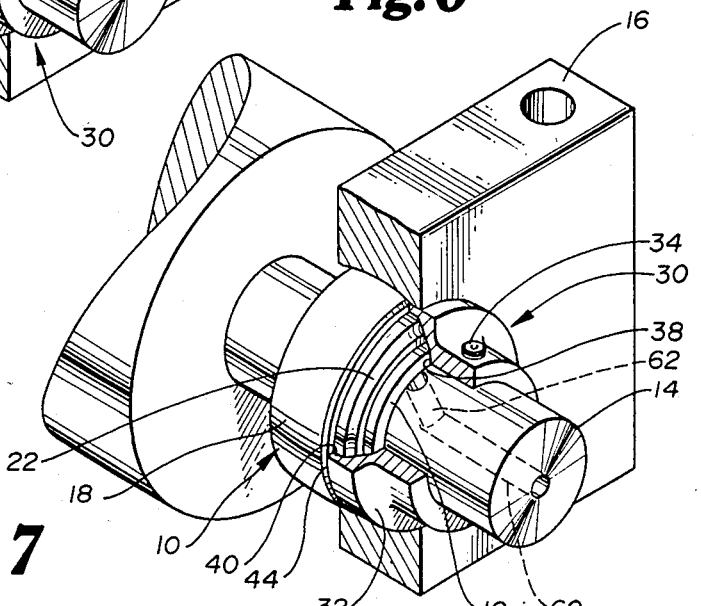
FIG. 6 is a perspective view of the form of FIG. 5 where the shaft has been drilled with holes conducting air under pressure through the shaft and into the area within the protector bearing.

The bearing protector of FIG. 6 is similar to that shown in FIGS. 3 and 5. However, the combination of the shaft, bearing and protector 30 of FIG. 6 provides a nearly dust-free bearing seal. Shaft 14 includes an axial hole 60 which communicates with a hole 62 which opens near inner race 12 as shown. A source of low pressure air (not shown) may be applied to axial hole 60. Air is thusly forced through the running clearance 44 which prevents dust from passing therein. A relatively dust-free environment is thereby provided to the bearing seal, greatly extending the bearing life.

Figure 7:
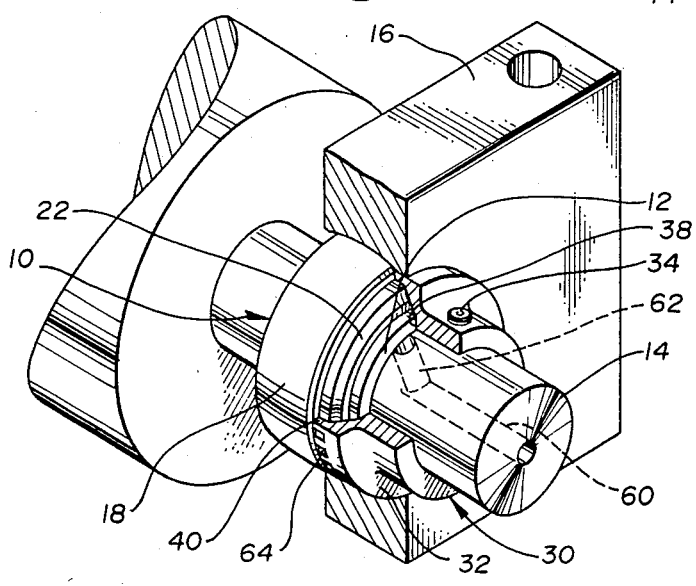
FIG. 7 is an alternative embodiment of the invention wherein the rim of the protector nearest the outer bearing race has been slotted to centrifugally pump air from holes in the shaft.
Figure 8:
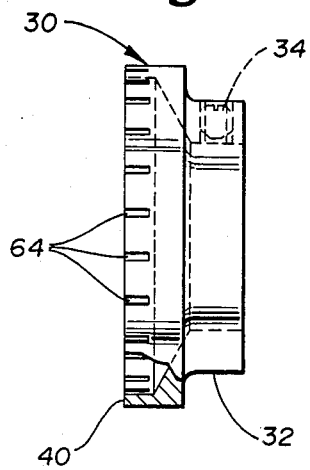
FIG. 8 is a side elevation of the embodiment of FIG. 7.
Figure 9:
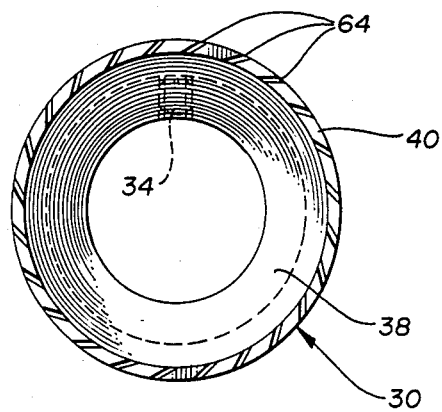
FIG. 9 is a side elevational view of the embodiment of FIGS. 7 and 8.

The protector shown in FIGS. 7-9 also employs the use of air drawn through the shaft to keep contaminated air from entering the seal area of the bearing. Shaft 14 includes axial hole 60 and side hole 62 which opens adjacent inner race 12. Instead of relying on low pressure air, air is pulled through axial hole 60 and out through slots 64 cut in outer rim 40 of the protector 30. Slots 64 act as a squirrel cage fan pulling clean air through the vent hole 60 of the shaft and exhausting through the slots. The faster the shaft turns the protector, the more air is expelled from the protector fins. An air filter (not shown) may be inserted into axial hole 60 to insure that the intake air is clean. The clean air drawn through the intake vent keeps contaminated air from entering the seal area of the bearing. As shown in FIG. 9, slots 64 are angled as in a squirrel cage fan to create the desired suction.

Figure 10:
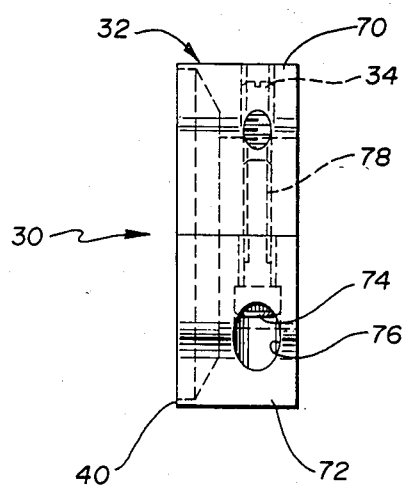
FIG. 10 is a side elevational view of the form of the invention in which the protector is split into two halves held together by bolts.
Figure 11:
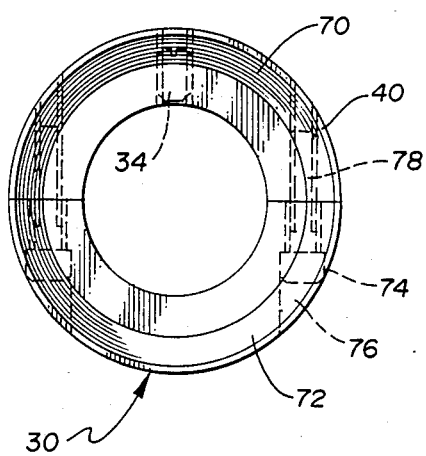
FIG. 11 is a bearing side elevational view of the embodiment shown in FIG. 10.

FIGS. 10 and 11 show a protector 30 which is formed from two halves 70 and 72. The split protector is used when it is desired to install protectors over shafts without removing the bearing and shaft from the housing. Halves 70 and 72 are screwed together by inserting screws 74 into bores 76 and threaded holes 78. The protector of FIGS. 10 and 11 may be quickly installed to provide bearing protection to many different types of new and used equipment by merely fitting the halves 70 and 72 over the shaft and connecting them with screws.

All forms of the protector as shown in FIGS. 3-11 protect bearings from damage by reducing or eliminating side pressure on the seals. The protectors decrease the incidence of debris packing against the bearing since the protector rotates with the shaft. Any debris which does tend to pack near the bearing applies pressure to the protector, not the seals.

The protectors of the invention allow the use of less expensive bearings and seals. The protectors may be easily and quickly positioned adjacent bearings to protect the bearings. The protector causes no damage to the bearing since it has no surface which contacts the stationary outer race.

In considering this invention, it must be remembered that the disclosure is illustrative only and that the scope of the invention is to be determined by the claims.

What is claimed is:

1. A device for providing thrust protection to spherical bearings mounted in a housing, the device comprising;
   (a) protector means for covering the exposed portion of the seals of a spherical bearing to provide thrust protection to said bearing, said means being constructed and arranged to cover the inner race and substantially all of the outer race of said bearing without contacting the outer race of said bearing;
   (b) means for rigidly coupling said protector means to a shaft attached to said bearing such that said protector means rotates with said shaft; and
   (c) said protector means being configured to closely fit over said shaft to limit the entrance of debris into said protector means.

2. The device of claim 1 wherein said protector means includes a step means for contacting the inner race of a bearing, said step means being constructed and arranged such that an outer rim of said protector means is spaced slightly from the outer race of said bearing for running clearance.

3. The bearing protector of claim 2 further including a plurality of slits in the outer rim of the protector, said slits being constructed and arranged such that suction is generated through said slits when said protector rotates on a shaft adjacent a bearing.

4. The bearing protector of claim 1 wherein said coupling means is a set screw.

5. The bearing protector of claim 1 further including seal means between said protector and shaft for sealing the interface between the shaft and protector.

6. The bearing protector of claim 1 further including seal means on said protector means outer rim for providing a seal between the outer rim and outer race of a bearing.

7. The bearing protector of claim 1 wherein said outer rim includes a plurality of slots along its circumference, said slots being constructed and arranged so as to create a suction pulling air from the interior of said protector adjacent a shaft and exiting through said slots.

8. The bearing protector of claim 1 wherein said coupling means is an eccentric lock fit to the shaft.

9. In combination, a bearing, a shaft and a bearing protector in accordance with claim 1;
   (a) said bearing having inner and outer races; and
   (b) said shaft having an axial bore extending from an end of said shaft and opening out the side of said shaft adjacent said bearing.

10. The combination of claim 9 further including, seal means between said protector and shaft for sealing the interface between said protector and shaft.

11. The combination of claim 9 further including means for supplying air under pressure into the axial bore of said shaft from said shaft end.

12. The combination of claim 9 wherein said protector has a plurality of radially extended slits cut into the periphery of the protector immediately adjacent the outer race of a bearing when installed, said slits being constructed and arranged such that air is pulled through said shaft axial bore when said protector and shaft rotate.

* * * * *